(12) United States Patent
Strobl et al.

(10) Patent No.: US 7,444,514 B2
(45) Date of Patent: Oct. 28, 2008

(54) GROUP KEY EXCHANGES WITH FAILURES

(75) Inventors: Reto Strobl, Bad Ragaz (CH); Christian Chachin, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 919 days.

(21) Appl. No.: 10/964,446

(22) Filed: Oct. 13, 2004

(65) Prior Publication Data
US 2005/0086470 A1    Apr. 21, 2005

(30) Foreign Application Priority Data
Oct. 15, 2003   (EP)   ................................... 03405739

(51) Int. Cl.
*H04L 9/00* (2006.01)
(52) U.S. Cl. .......................... 713/171; 380/30; 380/273; 380/277
(58) Field of Classification Search ................ 713/171; 380/30, 273, 277; 726/15
See application file for complete search history.

(56) References Cited

U.S. PATENT DOCUMENTS

| | | | | |
|---|---|---|---|---|
| 4,569,015 | A * | 2/1986 | Dolev et al. ................. | 709/201 |
| 6,671,821 | B1 * | 12/2003 | Castro et al. .................... | 714/4 |
| 6,941,457 | B1 * | 9/2005 | Gundavelli et al. .......... | 713/163 |
| 7,260,716 | B1 * | 8/2007 | Srivastava .................... | 713/163 |
| 7,340,603 | B2 * | 3/2008 | Asano ......................... | 713/163 |
| 2004/0139146 | A1 * | 7/2004 | Cachin et al. ............... | 709/200 |

OTHER PUBLICATIONS

An Improved Key Management Scheme for Large Dynamic Groups Using One-Way Function Trees by Wei-Chi Ku & Shuai-Min Chen Published by IEEE Department of Computer Science and Information Engineering Fu Jen Catholic University 2003.*
Elk, a New Protocol for Effiecient Large-Group Key Distribution by Adrian Perrig, Dawn Song, and J.D. Tygar Published by IEEE—University of California Berkeley 2001.*
Kronos: A Scalable Group Re-Keying Approach for Secure Multicast by Sanjeev Setia, Samir Koussih, Sushi Jajodia, and Eric Harder Published by IEEE Center for Secure Information Systems George Mason University and National Security Agency in 2000.*

\* cited by examiner

*Primary Examiner*—Ellen Tran
(74) *Attorney, Agent, or Firm*—Cantor Colburn LLP; Pete Tennet

(57) ABSTRACT

Described are a method for generating a session key on demand in a network, a computer program element, a computer program product stored on a computer usable medium, and a computer device for executing the computer program product. The method generates a session key sk on demand in a network among n participating network devices with up to a number t of faulty devices. Each participating network device sends and receives a series of messages and performs the steps of: a) choosing a private and public key $d_i$, $e_i$ according to a public key encryption scheme, and broadcasting the public key $e_i$ to each participating network device; b) choosing a local contribution value $y_i$ from a multiplicative group $G_q$ of size q; c) in each case of receiving the public key $e_j$ from one of the participating network devices, encrypting the local contribution value $y_i$ under the received public key $e_j$ to an encrypted contribution value $y_{ij}$ and responding to the one participating network device the encrypted contribution value $y_{ij}$; d) receiving encrypted contribution values $y_{ji}$ and deriving decrypted contribution values $y_j$ by applying the private key $d_i$; e) deriving a blinded session key $bsk_i$ from the decrypted contribution values $y_j$ and the local contribution value $y_i$; f) agreeing on one of the blinded session keys $bsk_j$ by using an agreement protocol; and g) deriving the session key sk from the agreed-on blinded session key $bsk_j$ by applying one of the decrypted contribution values $y_j$ and the contribution value $y_i$.

4 Claims, 4 Drawing Sheets

GROUP KEY EXCHANGES WITH FAILURES

BACKGROUND

1. Technical Field

The present invention is related to a method for generating a session key on demand in a network among n participating network devices with up to a number t of faulty devices. Moreover, the invention is also related to a computer program element, a computer program product stored on a computer usable medium, and a computer device for executing the computer program product.

2. Background of the Invention

Group key exchange (GKE) protocols allow a group of parties or participating network devices communicating over an asynchronous network of point-to-point links to establish a common session key such that anyone outside the group that can only observe the network traffic cannot learn this key. That means an adversary which fully controls the network links cannot learn the key. The session key can later be used to achieve cryptographic goals like for example multicast message confidentiality, or multicast data integrity. Hence, group key exchange protocols are relevant to applications such as secure video- or teleconferencing, or other collaborative applications.

The primary goals of a group key exchange protocol is to ensure secrecy of the session key, and to ensure that every member of the group eventually terminates the protocol and computes the session key. So far, group key exchange protocols have been designed to meet these goals only as long as all members of the group follow the protocol specification, as for example described in the publication by M. Burmester and Y. Desmedt, "A secure and efficient conference key distribution system", in Eurocrypt '94, 1994. However, the known protocols have the drawback that if only a single party crashes, i.e., stops to participate in the protocol, then no party of the group will terminate the protocol anymore. On one side, this makes such protocols specifically vulnerable to denial of service attacks, as the execution time of the protocol is determined by the slowest member of the group. On the other side, this drawback also imposes undesired restrictions on an application built on top of the group key exchange protocol. For example, a secure video conference involving a large number of participants could not start until the last member has joined the system.

From the above it follows that there is still a need in the art for an improved protocol that tolerates any minority of parties to crash. Henceforth, a party that crashes is called faulty. The solution should use a constant number of rounds, in order to makes it suitable for use in practice.

SUMMARY OF THE INVENTION

In accordance with the present invention, there is provided a method for generating a session key sk on demand in a network among n participating network devices with up to a number t of faulty devices, with t<n/2, each participating network device i sending and receiving a series of messages, therein performing the following steps:

a) choosing a private and public key $d_i$, $e_i$ according to a public key encryption scheme, and broadcasting the public key $e_i$ to each other participating network device;

b) choosing a local contribution value $y_i$ from a multiplicative group $G_q$ of size q;

c) in each case of receiving the public key $e_j$ from one of the other participating network devices, encrypting the local contribution value $y_i$ under the received public key $e_j$ to an encrypted contribution value $y_{ij}$ and responding to the one participating network device with the encrypted contribution value $y_{ij}$;

d) receiving at least n−t−1 encrypted contribution values $y_{ji}$ and deriving decrypted contribution values $y_j$ by applying the private key $d_i$;

e) deriving a blinded session key $bsk_i$ from the decrypted contribution values $y_j$ and the local contribution value $y_i$;

f) agreeing on one of the blinded session keys $bsk_j$ by using an agreement protocol; and g) deriving the session key sk from the agreed-on blinded session key $bsk_j$ by applying one of the decrypted contribution values $y_j$ and the contribution value $y_i$.

The described method provides an efficient group key exchange protocol among a fixed set of parties or participating network devices that tolerates any minority of parties or devices to crash. Moreover, the protocol uses a constant number of rounds, which makes it suitable for use in practice. The protocol terminates for every member, that is each participating network device, as long as at most a minority of the participants crash, which is seen to be optimal. The described protocol is conceptually simple and efficient, which makes it even more suitable for practice. In general, it comprises the following two stages. In a first stage, the group members, i.e. the participating network devices, exchange keying information using two communication rounds and a total of $2n^2$ messages, where n denotes the number of participating network devices. In a second stage, they execute a randomized asynchronous consensus protocol to agree on the information (distributed in the first stage) that should be taken into account for computing the session key sk. Given that such consensus protocols can be implemented efficiently, e.g. using expected $O(n^2)$ messages, and expected 6 communication rounds, the construction yields very efficient group key exchange protocols that are suitable for use in many practical settings.

Because the protocol is asynchronous, there is no need for the participating network devices to have synchronized clocks or bounds on their relative execution speeds or bounds on the delay of messages sent among the participating network devices.

The private key $d_i$ in step a) can be chosen as a random element from a set $Z_q$ of positive integers modolo q, where q is preferably a large prime, and the public key $e_j$ is derivable by raising a generator g of the multiplicative group $G_q$ to the power of a first monotone function $f_1$ of the private key $d_i$. This allows an efficient selection.

The local contribution value $y_i$ in step b) can be chosen by first choosing a random value $x_i$ from the set $Z_q$ and then deriving the contribution value $y_i$ by raising the generator g to the power of a second monotone function $f_2$ of the random value $x_i$. This allows for an efficient encryption and decryption of such a contribution value, as explained below.

The step c) of encrypting the contribution value $y_i$ under the received public key $e_j$ to the encrypted contribution value $y_{ij}$ can be performed by raising the received public key $e_j$ to the power of the second monotone function $f_2$ of the random value $x_i$. This allows an efficient encryption.

The decrypted contribution values $y_j$ in step d) can be derived by raising the encrypted contribution $y_{ji}$ to the power of the multiplicative inverse of the first monotone function $f_1$ of the private key $d_i$. This allows an efficient decryption.

In general, the mentioned steps a) to d) allow an encryption and decryption of the local contribution value in an efficient way in order to save and optimize computing power.

Further the step e) of deriving the blinded session key $bsk_i$ can further comprise the steps of:

$e_1$) deriving a first sequence of at least n−t participating network devices comprising the local participating network device and the participating network devices from which the at least n−t−1 encrypted contribution values $y_{ji}$ have been received;

$e_2$) deriving a second sequence of at least n−t contribution values, where the m'th contribution value $y_{i_m}$ is the local contribution value $y_i$ of the m'th participating network device;

$e_3$) computing a third sequence of at least n−t quotients where the m'th quotient is defined as the m'th contribution value divided by the m+1 mod n−t'th contribution value; and $e_4$) defining the blinded session key $bsk_i$ as the first sequence and the third sequence.

Since there are no exponentiations and only divisions, these steps turn also out to be efficient and help to reduce the computing power.

The step g) of deriving the session key sk can further comprise the steps of:

$g_1$) deriving an un-blinding value u as the local contribution value of the k'th participating network device defined by the agreed-on blinded session key $bsk_j$, where k is arbitrary;

$g_2$) deriving a fourth sequence of at least n−t modified quotients, where the m'th modified quotient is defined as the m'th power of the k+m mod n−t'th quotient defined by the agreed-on blinded session key $bsk_j$; and $g_3$) deriving the session key (sk) as the product of the modified quotients multiplied with the n−t'th power of the un-blinding value u.

In accordance with further aspects of the present invention, there is provided a computer program element comprising program code means for performing the method when said program is run on a computer, and there is provided a computer program product stored on a computer usable medium, comprising computer readable program means for causing a computer to perform the method In accordance with another aspect of the present invention, there is provided a computer device that comprises the mentioned computer program product, and a processor for executing the computer program product when the computer program product is run on the computer device.

DESCRIPTION OF THE DRAWINGS

Preferred embodiments of the invention are described in detail below, by way of example only, with reference to the following schematic drawings.

The drawings are provided for illustrative purposes only.

DETAILED DESCRIPTION OF EMBODIMENTS

Figure 1:
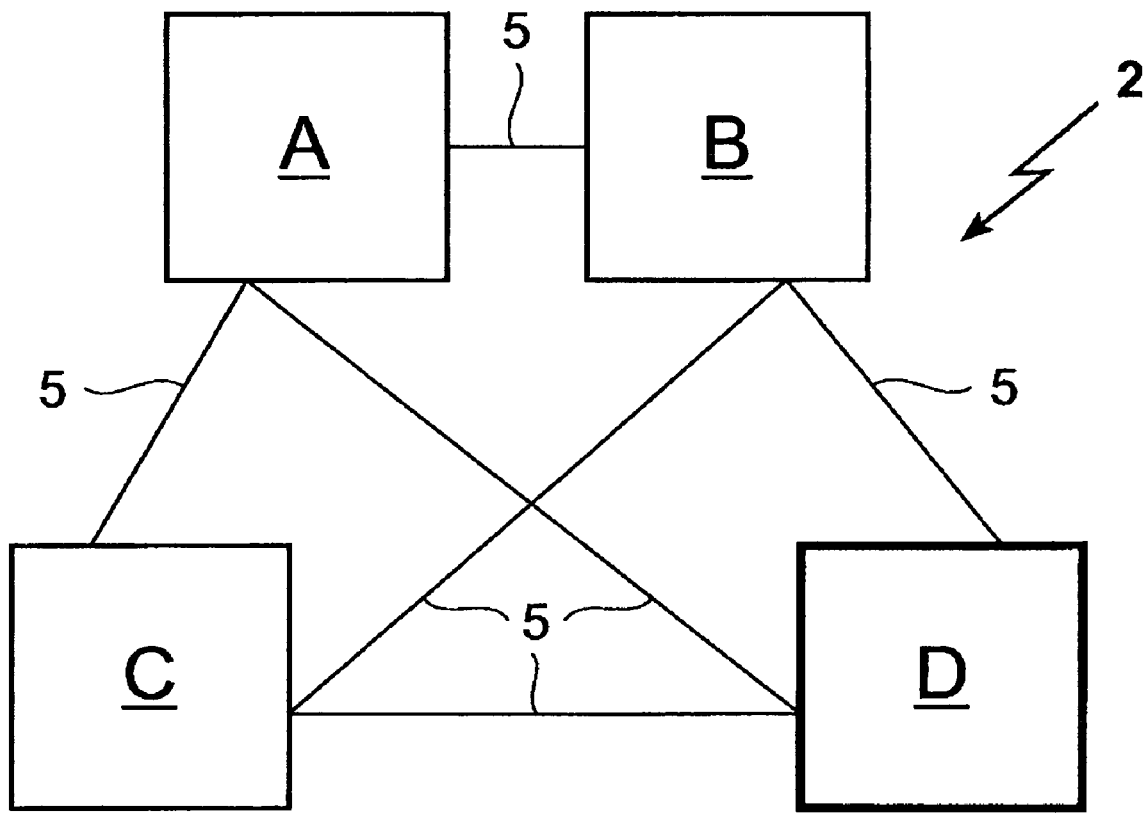
FIG. 1 shows a typical asynchronous network with multiple participating network devices.

FIG. 1 shows an example of a common computer system 2 consisting here of four participating network devices A, B, C, D, which are connected via communication lines 5 to a network, e.g. the Internet. The system, in which a group key exchange protocol is performed, may have t faulty devices. Such faulty device is here the participating network device B also designated by "X". Each participating network device A, B, C, D may be any type of computer device known in the art from a computer on a chip, a wearable or laptop computer, a mobile phone to a large computer system. The communication lines can be any communication means commonly known to transmit data or messages from one participating network device A, B, C, D to another. For instance, the communication lines may be either single, bi-directional communication lines between each pair of participating network devices A, B, C, D or one unidirectional line in each direction between each pair of participating network devices A, B, C, D. The computer system 2 and communication lines are well known in the art. It is possible that each of the participating network devices A, B, C, D sends information to itself; in this case an equivalent result could be achieved by merely moving data within the participating network device and not sending it over a communication line to itself. The common computer system 2 is shown to facilitate the description of a described group key exchange protocol for generating a session key sk on demand in an asynchronous network.

The following steps indicate the described group key exchange protocol among a fixed set of participating network devices that tolerates any minority of parties or devices to crash. A series of messages is sent and received by each participating network device A, B, C, D.

Figure 2:
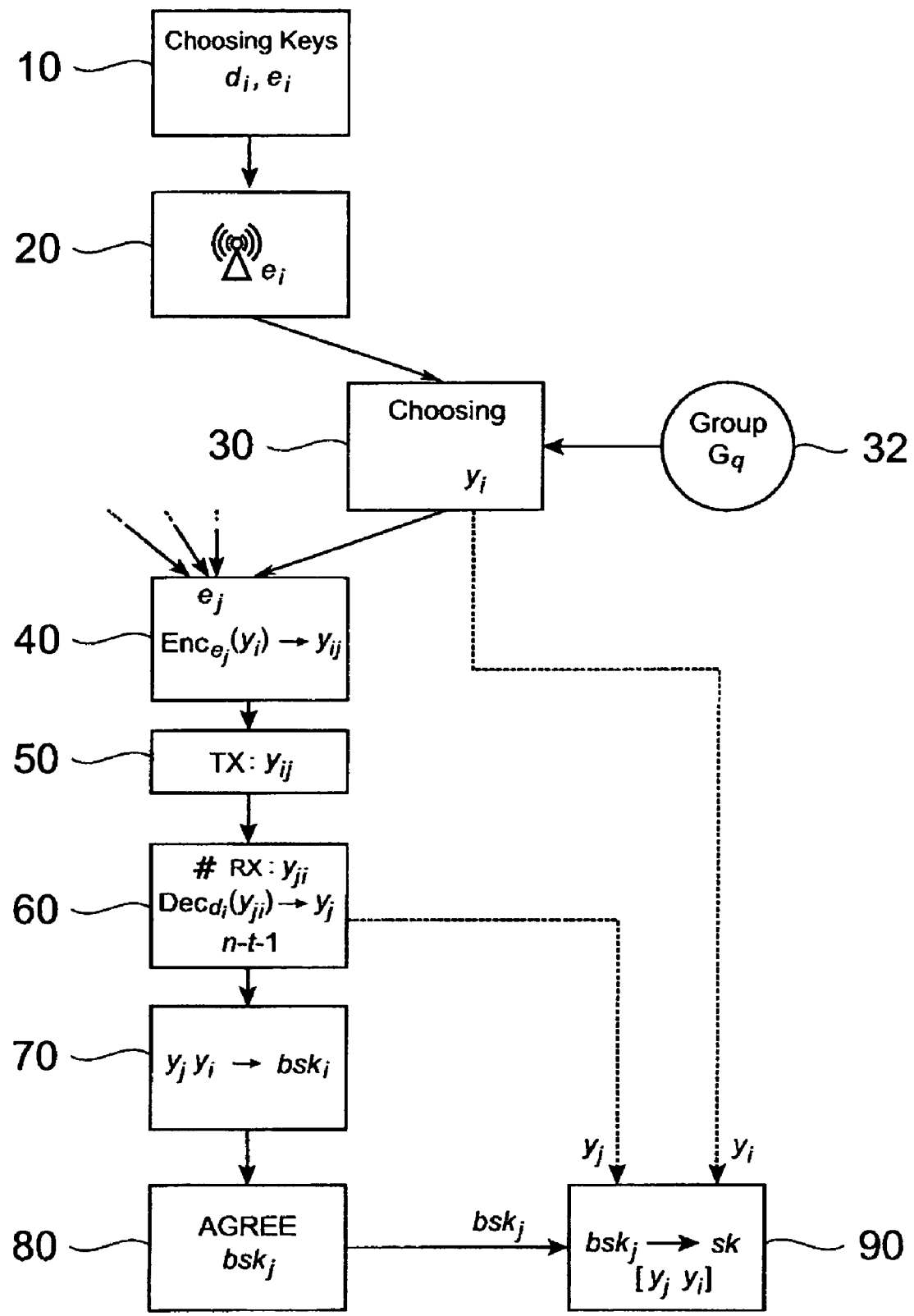
FIG. 2 shows a schematic diagram of the group key exchange protocol according to the present invention.

FIG. 2 shows a schematic diagram of the described group key exchange protocol in which the session key sk is generated on demand in the network among n participating network devices A, B, C, D with up to a number t of faulty devices, with t<n/2. In general, each participating network device sends and receives a series of messages and performs the following described steps. In view of simplicity, the following steps are regarded for the participating network device D, also herein regarded as the device with the index i in an enumeration of the participating network devices. At first, as indicated with step 10, a private and public key $d_i$, $e_i$ are chosen according to a public-key encryption scheme, e.g. El Gamal or RSA, and then, as indicated with step 20, the public key $e_i$ is broadcast to each participating network device A, B, C. As indicated with step 30, a local contribution value $y_i$ is chosen from a multiplicative group $G_q$ of size q, indicated in circle 32.

As indicated with step 40, when the public key $e_j$ from another participating network device A, B, C is received, the local contribution value $y_i$ is encrypted under the received public key $e_j$ to an encrypted contribution value $y_{ij}$ and sent to the respective participating network device A, B, C from which the public key $e_j$ was received, as indicated with step 50. Herein the index j denotes one of the another participating network device A, B, C. When at least n−t−1 encrypted contribution values $y_{ji}$ are received then decrypted contribution values $y_j$ can be decrypted by applying the private key $d_i$, as indicated with step 60. As indicated with step 70, a blinded session key $bsk_i$ is derived from the decrypted contribution values $y_j$ and the local contribution value $y_i$.

As indicated with step 80, the participating network devices A, B, C, D then perform an agreement protocol to agree on the blinded session key $bsk_j$ as computed by one of the participating network devices. The agreement protocol may be performed with or without a dealer. Such an agreement protocol is disclosed in US20010039630A1, entitled "Method of achieving multiple processor agreement in asynchronous networks", presently assigned to the assignee of the instant application and the disclosure of which is incorporated herein by reference.

Finally, as indicated with step 90, the session key sk is derived from the agreed-on blinded session key $bsk_j$ by applying one of the decrypted contribution values $y_j$ and the local contribution value $y_i$. As indicated by dotted arrow lines in the figure, the contribution value $y_i$ arises from step 30 whilst the decrypted contribution values $y_j$ was obtained in step 60.

Figure 3:
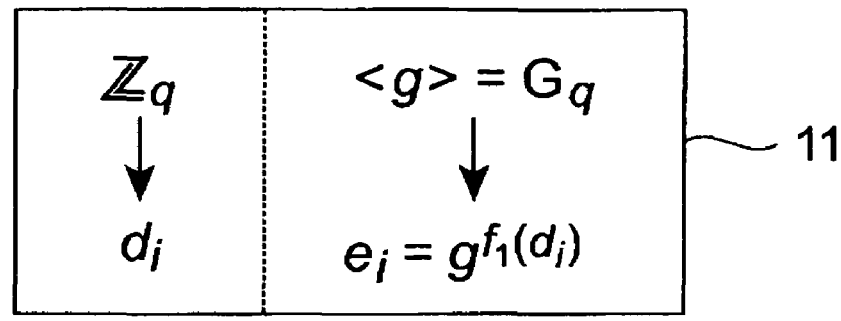
FIGS. 3 to 8 show more details to the group key exchange protocol of FIG. 2.

FIGS. 3 to 8 show further details to the group key exchange protocol of FIG. 2. As indicated in FIG. 3 with step 11, the private key $d_i$ in step 10 can be chosen as a random element from a set $Z_q$ of positive integers modolo q, where q is preferably a large prime, and the public key $e_i$ is derived by raising a generator g of the multiplicative group $G_q$ to the power of a first monotone function $f_1$ of the private key $d_i$. This mathematically reads as:

$$e_i = g^{f_1(d_i)}.$$

Figure 4:
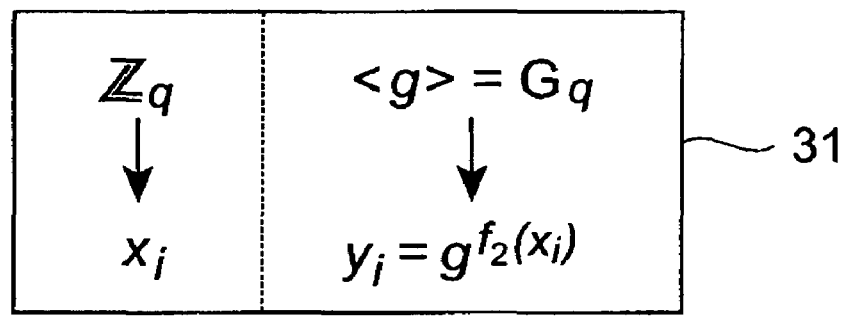

As indicated in FIG. 4 with step 31, the local contribution value $y_i$ in step 30 can be chosen by first choosing a random value $x_i$ from the set $Z_q$ and then deriving the contribution value $y_i$ by raising the generator g to the power of a second monotone function $f_2$ of the random value $x_i$, which reads as:

$$y_i = g^{f_2(x_i)}.$$

Figure 5:
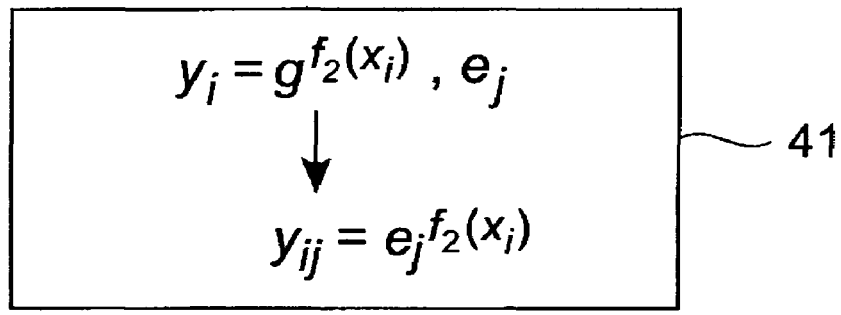

As indicated in FIG. 5 with step 41, the encryption in step 40 of the contribution value $y_i$ under the received public key $e_j$ to the encrypted contribution value $y_{ij}$ can be performed by raising the received public key $e_j$ to the power of the second monotone function $f_2$ of the random value $x_i$, which can be expressed by the formula:

$$y_{ij} = e_j^{f_2(x_i)}.$$

Figure 6:
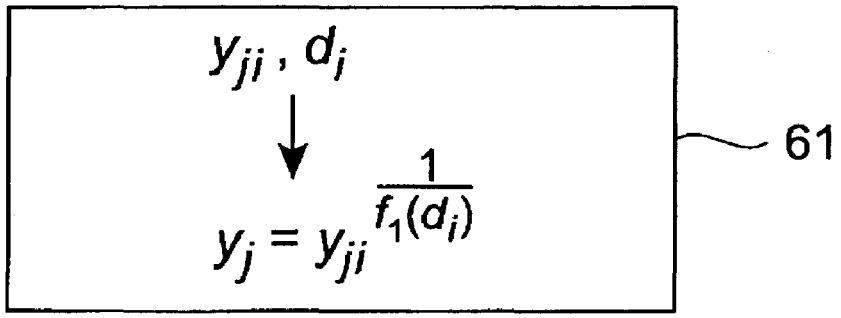

As indicated in FIG. 6 with step 61, the decrypted contribution values $y_j$ in step 60 are derivable by raising the encrypted contribution value $y_{ji}$ to the power of the multiplicative inverse of the first monotone function $f_1$ of the private key $d_i$. This can also be described by:

$$y_j = y_{ji}^{\frac{1}{f_1(d_i)}}.$$

It is noticed that the decrypted contribution value $y_j$ derived from the encrypted contribution value received from some other participating network device is the same as the local contribution value of this other device.

Figure 7:
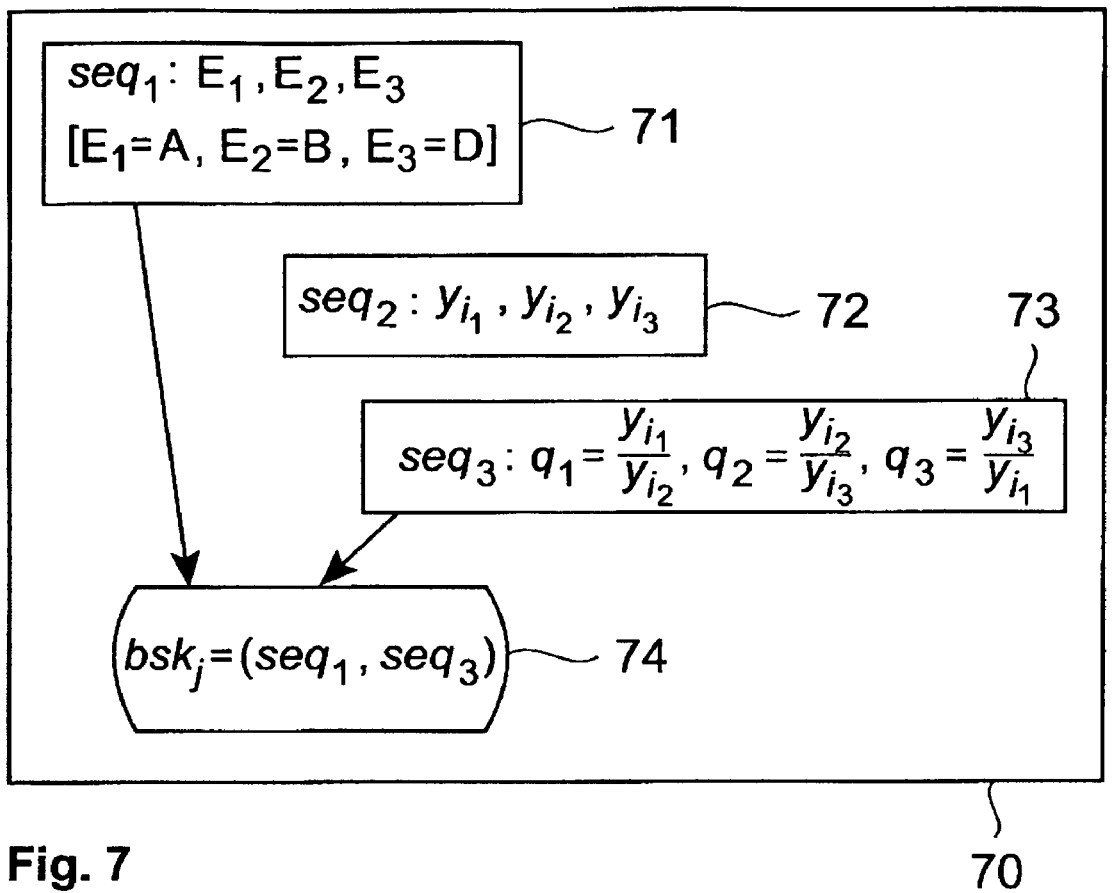

As indicated in FIG. 7, the step 70 of deriving the blinded session key $bsk_i$ can comprise the following steps 71 to 74. As indicated in step 71, a first sequence $seq_1$ of at least n−t participating network devices $E_1, E_2, E_3$ is derived. The first sequence $seq_1$ comprises here the local participating network device D and the participating network devices A, B from which the at least n−t−1 encrypted contribution values $y_{ji}$ have been received. For example, the sequence could be allocated as $[E_1=A, E_2=B, E_3=D]$, as shown in the figure. In step 72, a second sequence $seq_2$ of at least n−t contribution values $y_{i_1}, y_{i_2}, y_{i_3}$ is derived, where the m'th contribution value $Y_{i_m}$ is the local contribution value $y_i$ of the m'th participating network device $E_m$. Further, as indicated in step 73, a third sequence $seq_3$ of at least n−t quotients $q_1, q_2, q_3$ is computed, where the m'th quotient $q_m$ is defined as the m'th contribution value $y_{i_m}$ divided by the m+1 modulo n−t'th contribution value $y_{i_{m+1 \bmod q}}$, which here is $$q_1 = \frac{y_{i_1}}{y_{i_2}},\ q_2 = \frac{y_{i_2}}{y_{i_3}},\ q_3 = \frac{y_{i_3}}{y_{i_1}}.$$

Finally, as indicated by the arrows and step 74, the blinded session key $bsk_i$ is defined as the first sequence $seq_1$ and the third sequence $seq_3$, that is $bsk_i=(seq_1, seq_3)$.

Figure 8:
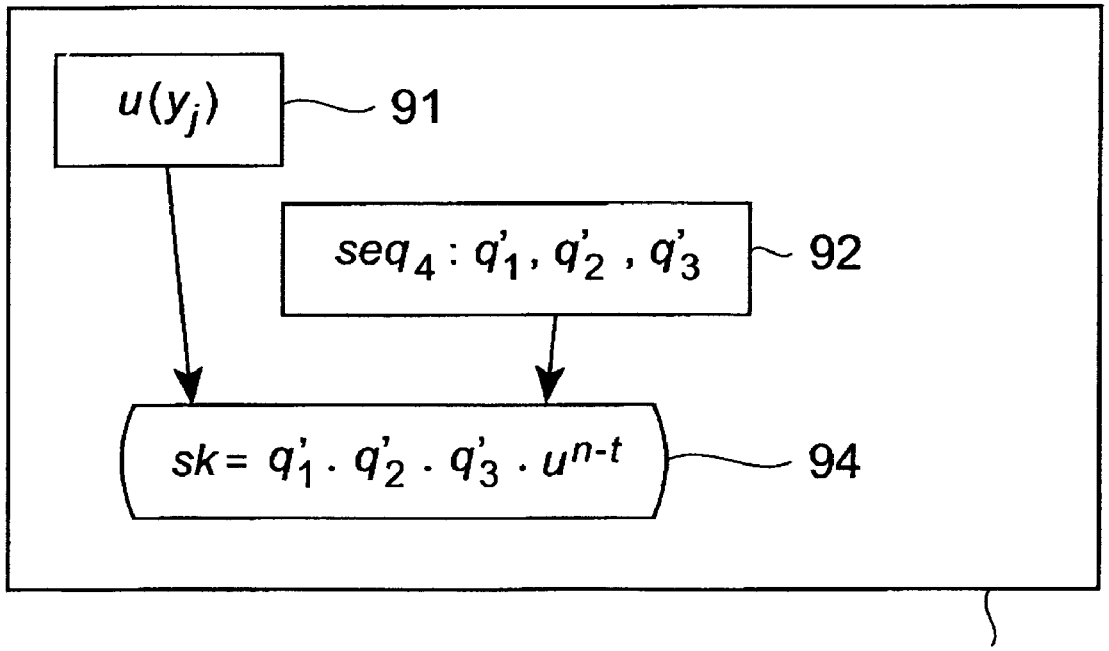

As indicated in FIG. 8, the step 90 of deriving the session key sk can comprise the following steps 91 to 93. As indicated in step 91, an un-blinding value u can be derived as the local contribution value $y_j$ of the k'th participating network device $E_k$ defined by the agreed-on blinded session key $bsk_j$, where k is arbitrary. Moreover, as indicated in step 92, a fourth sequence $seq_4$ of at least n−t modified quotients $q'_1, q'_2, q'_3$ is derived, in which the m'th modified quotient $q'_m$ is defined as the m'th power of the k+m modulo n−t'th quotient $q_{k+m \bmod n-t}$ defined by the agreed-on blinded session key $bsk_j$. Finally, as indicated by the arrows and step 93, the session key sk is derived as the product of the modified quotients $q'_1, q'_2, q'_3$ multiplied with the n−t'th power of the un-blinding value u, which also reads as:

$$sk = q'_1 * q'_2 * q'_3 * u^{n-t}.$$

Any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A method for generating a session key (sk) on demand in a network among n participating network devices (A, B, C, D) with up to t faulty devices, wherein t<n/2, the method comprising each participating network device (D):

choosing a private and public key ($d_i$, $e_i$) according to a public key encryption scheme, and broadcasting the public key ($e_i$) to each other participating network device (A, B, C);

choosing a local contribution value ($y_i$) from a multiplicative group ($G_q$) of size q;

in each case of receiving a public key ($e_j$) from one of the other participating network devices (A, B, C), encrypting the local contribution value ($y_i$) under the received public key ($e_j$) to an encrypted contribution value ($y_{ij}$) and sending in reply to the one of the other participating network devices (A, B, C) the encrypted contribution value ($y_{ij}$);

receiving at least n−t−1 encrypted contribution values ($y_{ji}$) and deriving decrypted contribution values ($y_j$) by applying the private key ($d_i$);

deriving a blinded session key ($bsk_i$) from the decrypted contribution values ($y_j$) and the local contribution value ($y_i$), wherein deriving the blinded session key ($bsk_i$) comprises:

deriving a first sequence of at least n−t participating network devices ($E_1$, $E_2$, $E_3$) comprising the local participating network device (D) and the participating network devices (A, B) from which the at least n−t−1 encrypted contribution values ($y_{ji}$) have been received;

deriving a second sequence of at least n−t contribution values ($y_{i1}$, $Y_{i2}$, $Y_{i3}$), where the m'th contribution value ($y_{im}$) is the local contribution value ($y_i$) of the m'th participating network device ($E_m$);

computing a third sequence of at least n−t quotients ($q_1$, $q_2$, $q_3$) where the m'th quotient ($q_m$) is defined as the m'th contribution value ($y_{im}$) divided by the m+1 modulo n−t'th contribution value ($y_{im+1 \bmod q}$); and defining the blinded session key ($bsk_i$) as the first sequence and the third sequence;

agreeing on one of the blinded session keys ($bsk_j$) by using an agreement protocol; and deriving the session key (sk) from the agreed-on blinded session key ($bsk_j$) by applying one of the decrypted contribution values ($y_j$) and the contribution value ($y_i$), wherein deriving the session key (sk) comprises:

deriving an un-blinding value (u) as the local contribution value ($y_j$) of the k'th participating network device ($E_k$) defined by the agreed-on blinded session key ($bsk_j$), where k is arbitrary;

deriving a fourth sequence of at least n−t modified quotients ($q'_1$, $q'_2$, $q'_3$), where the m'th modified quotient ($q'_m$) is defined as the m'th power of the k+m modulo n−t'th quotient ($q_{k+m \bmod n-t}$) defined by the agreed-on blinded session key ($bsk_j$); and deriving the session key (sk) as the product of the modified quotients ($q'_1$, $q'_2$, $q'_3$) multiplied with the n−t'th power of the un-blinding value (u).

2. A computer program element comprising program code means for performing a method for generating a session key (sk) on demand in a network among n participating network devices (A, B, C, D) with up to t faulty devices, wherein t<n/2, the method comprising each participating network device (D):

choosing a private and public key ($d_i$, $e_i$) according to a public key encryption scheme, and broadcasting the public key ($e_i$) to each other participating network device (A, B, C);

choosing a local contribution value ($y_i$) from a multiplicative group ($G_q$) of size q;

in each case of receiving a public key ($e_j$) from one of the other participating network devices (A, B, C), encrypting the local contribution value ($y_i$) under the received public key ($e_j$) to an encrypted contribution value ($y_{ij}$) and sending in reply to the one of the other participating network devices (A, B, C) the encrypted contribution value ($y_{ij}$);

receiving at least n−t−1 encrypted contribution values ($y_{ji}$) and deriving decrypted contribution values ($y_j$) by applying the private key ($d_i$);

deriving a blinded session key ($bsk_i$) from the decrypted contribution values ($y_j$) and the local contribution value ($y_i$), wherein deriving the blinded session key ($bsk_i$) comprises:

deriving a first sequence of at least n−t participating network devices ($E_1$, $E_2$, $E_3$) comprising the local participating network device (D) and the participating network devices (A, B) from which the at least n−t−1 encrypted contribution values ($y_{ji}$) have been received;

deriving a second sequence of at least n−t contribution values ($y_{i1}$, $y_{i2}$, $y_{i3}$), where the m'th contribution value ($y_{im}$) is the local contribution value ($y_i$) of the m'th participating network device ($E_m$);

computing a third sequence of at least n−t quotients ($q_1$, $q_2$, $q_3$) where the m'th quotient ($q_m$) is defined as the m'th contribution value ($y_{im}$) divided by the m+1 modulo n−t'th contribution value ($y_{im+1 \bmod q}$); and defining the blinded session key ($bsk_i$) as the first sequence and the third sequence;

agreeing on one of the blinded session keys ($bsk_j$) by using an agreement protocol; and deriving the session key (sk) from the agreed-on blinded session key ($bsk_j$) by applying one of the decrypted contribution values ($y_j$) and the contribution value ($y_i$), wherein deriving the session key (sk) comprises:

deriving an un-blinding value (u) as the local contribution value ($y_j$) of the k'th participating network device ($E_k$) defined by the agreed-on blinded session key ($bsk_j$), where k is arbitrary;

deriving a fourth sequence of at least n−t modified quotients ($q'_1$, $q'_2$, $q'_3$), where the m'th modified quotient ($q'_m$) is defined as the m'th power of the k+m modulo n−t'th quotient ($q_{k+m \bmod n-t}$) defined by the agreed-on blinded session key ($bsk_j$); and deriving the session key (sk) as the product of the modified quotients ($q'_1$, $q'_2$, $q'_3$) multiplied with the n−t'th power of the un-blinding value (u).

3. A computer program product stored on a computer usable medium, comprising computer readable program means for causing a computer to perform a method for generating a session key (sk) on demand in a network among n participating network devices (A, B, C, D) with up to t faulty devices, wherein t<n/2, the method comprising each participating network device (D):

choosing a private and public key ($d_i$, $e_i$) according to a public key encryption scheme, and broadcasting the public key ($e_i$) to each other participating network device (A, B, C);

choosing a local contribution value ($y_i$) from a multiplicative group ($G_q$) of size q;

in each case of receiving a public key ($e_j$) from one of the other participating network devices (A, B, C), encrypting the local contribution value ($y_i$) under the received public key ($e_j$) to an encrypted contribution value ($y_{ij}$) and sending in reply to the one of the other participating network devices (A, B, C) the encrypted contribution value ($y_{ij}$);

receiving at least n−t−1 encrypted contribution values ($y_{ji}$) and deriving decrypted contribution values ($y_j$) by applying the private key ($d_i$);

deriving a blinded session key ($bsk_i$) from the decrypted contribution values ($y_j$) and the local contribution value ($y_i$), wherein deriving the blinded session key ($bsk_i$) comprises:

deriving a first sequence of at least n−t participating network devices ($E_1$, $E_2$, $E_3$) comprising the local participating network device (D) and the participating network devices (A, B) from which the at least n−t−1 encrypted contribution values ($y_{ji}$) have been received;

deriving a second sequence of at least n−t contribution values ($y_{i1}$, $y_{i2}$, $y_{i3}$), where the m'th contribution value ($y_{im}$) is the local contribution value ($y_i$) of the m'th participating network device ($E_m$);

computing a third sequence of at least n−t quotients ($q_1$, $q_2$, $q_3$) where the m'th quotient ($q_m$) is defined as the m'th contribution value ($y_{im}$) divided by the m+1 modulo n−t'th contribution value ($y_{im+1\ mod\ q}$); and defining the blinded session key ($bsk_i$) as the first sequence and the third sequence;

agreeing on one of the blinded session keys ($bsk_j$) by using an agreement protocol; and deriving the session key (sk) from the agreed-on blinded session key ($bsk_j$) by applying one of the decrypted contribution values ($y_j$) and the contribution value ($y_i$), wherein deriving the session key (sk) comprises:

deriving an un-blinding value (u) as the local contribution value ($y_j$) of the k'th participating network device ($E_k$) defined by the agreed-on blinded session key ($bsk_j$), where k is arbitrary;

deriving a fourth sequence of at least n−t modified quotients ($q'_1$, $q'_2$, $q'_3$), where the m'th modified quotient ($q'_m$) is defined as the m'th power of the k+m modulo n−t'th quotient ($q_{k+m\ mod\ n-t}$) defined by the agreed-on blinded session key ($bsk_j$); and deriving the session key (sk) as the product of the modified quotients ($q'_1$, $q'_2$, $q'_3$) multiplied with the n−t'th power of the un-blinding value (u).

4. A computer device, comprising:
a computer program product according to claim 3; and
a network device (A, B, C, D) having a processor for executing the computer program product when the computer program product is run on the computer device.

* * * * *